United States Patent
Sunkara et al.

(10) Patent No.: US 7,323,539 B2
(45) Date of Patent: Jan. 29, 2008

(54) POLYTRIMETHYLENE ETHER GLYCOL AND POLYTRIMETHYLENE ETHER ESTER WITH EXCELLENT QUALITY

(75) Inventors: Hari Babu Sunkara, Hockessin, DE (US); Howard Chung-Ho Ng, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 17 days.

(21) Appl. No.: 10/918,079

(22) Filed: Aug. 12, 2004

(65) Prior Publication Data

US 2005/0020805 A1    Jan. 27, 2005

(51) Int. Cl.
| C08G 61/00 | (2006.01) |
| C08G 65/34 | (2006.01) |
| C07C 41/09 | (2006.01) |
| C07C 43/11 | (2006.01) |

(52) U.S. Cl. ............ 528/425; 528/396; 568/619; 435/158; 435/159; 435/162

(58) Field of Classification Search ............. 528/425, 528/396; 435/158, 159, 162; 568/619
See application file for complete search history.

(56) References Cited

U.S. PATENT DOCUMENTS

| | | |
|---|---|---|
| 2,520,733 A | 8/1950 | Morris et al. |
| 3,326,985 A | 6/1967 | Mason et al. |
| 4,213,000 A | 7/1980 | Coates |
| 4,885,410 A | 12/1989 | De Thomas |
| 5,015,789 A | 5/1991 | Arntz et al. |
| 5,171,898 A | 12/1992 | Arntz et al. |
| 5,276,201 A | 1/1994 | Haas et al. |
| 5,284,979 A | 2/1994 | Haas et al. |
| 5,334,778 A | 8/1994 | Haas et al. |
| 5,364,984 A | 11/1994 | Arntz et al. |
| 5,364,987 A | 11/1994 | Haas et al. |
| 5,403,912 A | 4/1995 | Gunatillake et al. |
| 5,527,973 A | 6/1996 | Kelsey |
| 5,633,362 A | 5/1997 | Nagarajan et al. |
| 5,686,276 A * | 11/1997 | Laffend et al. ............. 435/158 |
| 5,773,399 A | 6/1998 | Baillely et al. |
| 5,821,092 A | 10/1998 | Nagarajan et al. |
| 5,962,745 A | 10/1999 | Brossmer et al. |
| 5,986,145 A | 11/1999 | Powell et al. |
| 6,111,137 A | 8/2000 | Suizu et al. |
| 6,140,543 A | 10/2000 | Brossmer et al. |
| 6,191,321 B1 | 2/2001 | Forschner et al. |
| 6,232,511 B1 | 5/2001 | Haas et al. |
| 6,235,948 B1 | 5/2001 | Sunkara et al. |
| 6,245,844 B1 | 6/2001 | Kurian et al. |
| 6,255,442 B1 | 7/2001 | Kurian et al. |
| 6,277,289 B1 | 8/2001 | Kurian et al. |
| 6,281,325 B1 | 8/2001 | Kurian et al. |
| 6,284,930 B1 | 9/2001 | Haas et al. |
| 6,297,408 B1 | 10/2001 | Haas et al. |
| 6,325,945 B2 | 12/2001 | Kurian et al. |
| 6,331,264 B1 | 12/2001 | Kurian et al. |
| 6,335,421 B1 | 1/2002 | Kurian et al. |
| 6,342,464 B1 | 1/2002 | Arhancet et al. |
| 6,342,646 B1 | 1/2002 | Haas et al. |
| 6,350,895 B1 | 2/2002 | Kurian |
| 6,353,062 B1 | 3/2002 | Glardino et al. |
| 6,514,733 B1 | 2/2003 | Emptage et al. |
| 6,538,164 B1 | 3/2003 | Gallagher et al. |
| 6,562,457 B1 | 5/2003 | Goldfinger et al. |
| 6,590,065 B1 | 7/2003 | Goldfinger |
| 6,599,625 B2 | 7/2003 | Goldfinger et al. |
| 6,603,048 B1 | 8/2003 | Corbin et al. |
| 6,608,168 B1 | 8/2003 | Ng |
| 2002/0007043 A1 | 1/2002 | Sunkara et al. |
| 2002/0010374 A1* | 1/2002 | Sunkara et al. ............. 568/619 |
| 2004/0030060 A1 | 2/2004 | Sunkara et al. |
| 2004/0030089 A1 | 2/2004 | Sunkara |
| 2004/0030095 A1 | 2/2004 | Sunkara et al. |
| 2004/0077823 A1 | 4/2004 | Sunkara |
| 2004/0087819 A1 | 5/2004 | Powell et al. |
| 2004/0127673 A1 | 7/2004 | Sunkara |
| 2004/0211729 A1 | 10/2004 | Sunkara et al. |
| 2004/0225161 A1 | 11/2004 | Sunkara et al |
| 2004/0225162 A1 | 11/2004 | Sunkara et al. |
| 2005/0020805 A1 | 1/2005 | Sunkara et al. |

FOREIGN PATENT DOCUMENTS

| DE | 3917645 | 12/1989 |
| EP | 657527 | 8/1999 |
| WO | WO 98/57913 | 12/1998 |
| WO | WO 00/10953 | 3/2000 |
| WO | WO 00/14041 | 3/2000 |
| WO | WO 2004/076392 A1 | 9/2004 |

OTHER PUBLICATIONS

International Search Report, date of mailing: Dec. 17, 2004.
Written Opinion of the International Searching Authority, date of mailing: Dec. 17, 2004.
S. V. Conjeevaram, R. S. Benson, and D. J. Lyman, "Block Copolyurethanes Based on Polyoxytrimethylene Glycols", Journal of Polymer Science, Polymer Chemistry Edution, vol. 23, pp. 429-444 (1985).

(Continued)

*Primary Examiner*—Duc Truong

(57) ABSTRACT

A process is provided comprising contacting 1,3-propanediol with a suitable polymerization catalyst to produce polytrimethylene ether glycol or random polytrimethylene ether ester, wherein the 1,3-propanediol comprises about 10 microg/g or less peroxide compounds, based on the weight of 1,3-propanediol, and about 100 microg/g or less carbonyl compounds based on the weight of the 1,3-propanediol. Preferably, the 1,3-propanediol comprises about 100 microg/g or less of monofunctional alcohol compounds based on the weight of the PDO. In addition, polytrimethylene ether glycol and random polytrimethylene ether ester prepared by the process.

37 Claims, No Drawings

OTHER PUBLICATIONS

English Abstract of DE 3917645.
U.S. Appl. No. 10/872,685, filed Jun. 21, 2004.
U.S. Appl. No. 10/871,622, filed Jun. 18, 2004.
U.S. Appl. No. 10/839,188, filed May 5, 2004.
U.S. Appl. No. 10/839,655, filed May 4, 2004.
U.S. Appl. No. 10/804,260, filed Mar. 19, 2004.
U.S. Appl. No. 10/804,259, filed Mar. 19, 2004.
U.S. Appl. No. 10/743,223, filed Dec. 22, 2003.
U.S. Appl. No. 10/634,687, filed Aug. 5, 2003.
U.S. Appl. No. 10/634,668, filed Aug. 5, 2003.
U.S. Appl. No. 10/634,612, filed Aug. 5, 2003.
U.S. Appl. No. 10/423,363, filed Apr. 25, 2003.

S. M. Ghoreishi and M. R. Haghighi, Characterization and Reduction of Chromophores in Pulp Mill Effluents, Scientic Iranica, vol. 4, No. 3, pp. 131-138, Sharif University of Technology, Oct. 1997.

Herbert O. House, Modem Synthetic Reactions (second edition), W. A. Benjamin, Inc., Menlo Park, California, Reading, Massachusetts, London, Amsterdam, Don Mills, Ontario, Sydney, 1972.

Shigeo Nishimura, Professor Emeritus, Tokyo University of Agriculture and Technology, Handbook of Heterogeneous Catalytic Hydrogenation for Organic Synthesis, A Wiley-Interscience Publication, John Wiley & Sons, Inc., New York, Chichester, Weinheim, Brisbane, Singapore, Toronto.

* cited by examiner

POLYTRIMETHYLENE ETHER GLYCOL AND POLYTRIMETHYLENE ETHER ESTER WITH EXCELLENT QUALITY

PRIORITY

This application claims priority from Provisional U.S. Patent Application Ser. No. 60/468,228, filed May 6, 2003, and U.S. patent application Ser. No. 10/634,611, filed Aug. 5, 2003 (published as U.S. 2004-0225107 A1), now abandoned, both of which are incorporated herein by reference.

FIELD OF THE INVENTION

The present invention involves producing homo- and copolyethers of polytrimethylene ether glycol with excellent quality, in particular the color and the functionality, by use of 1,3-propanediol, preferably obtained from a renewable biological source.

BACKGROUND OF THE INVENTION 1,3-Propanediol (also hereinafter termed "PDO") is a monomer useful in the production of a variety of polymers including polyesters, polyurethanes, polyethers, and cyclic compounds. Homo and copolyethers of polytrimethylene ether glycol (hereinafter termed "PO3G") are examples of such polymers. The polymers are ultimately used in various applications including fibers, films, molded products, etc.

Chemical routes to generate 1,3-propanediol are known. For instance, 1,3-propanediol may be prepared from:
1. ethylene oxide over a catalyst in the presence of phosphine, water, carbon monoxide, hydrogen and an acid (the "hydroformylation route");
2. the catalytic solution phase hydration of acrolein followed by reduction (the "acrolein route").

Both of these synthetic routes to 1,3-propanediol involve the intermediate synthesis of 3-hydroxypropionaldehyde (hereinafter also termed "HPA"). The HPA is reduced to PDO in a final catalytic hydrogenation step. Subsequent final purification involves several processes, including vacuum distillation.

Preparing 1,3-propanediol by a ring-opening polymerization of a cyclic ether, oxetane, as described in J. Polymer Sci., Polymer Chemistry Ed. 23, 429-444 (1985) which is also incorporated by reference, is also known.

Biochemical routes to 1,3-propanediol have been described that utilize feedstocks produced from biological and renewable resources such as corn feed stock. Such PDO is hereinafter referred to as "biochemical PDO". For example, bacterial strains able to convert glycerol into 1,3-propanediol are found in e.g., in the species *Klebsiella, Citrobacter, Clostridium,* and *Lactobacillus*. The technique is disclosed in several patents, including, U.S. Pat. Nos. 5,633,362, 5,686,276, and, most recently, U.S. Pat. No. 5,821,092, all of which are incorporated herein by reference. In U.S. Pat. No. 5,821,092, Nagarajan et al., disclose inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the process of the invention provided a rapid, inexpensive and environmentally responsible source of 1,3-propanediol monomer useful in the production of polyesters, polyethers, and other polymers.

Precipitations (e.g., with 1,2-propylene glycol, as well as carboxylates or other materials) have been used since the early 1980's to separate the colored and odiferous components from desired products (such as enzymes) to obtain purified preparations. Precipitating the high molecular weight constituents from the fermentor liquors, then bleaching these components with a reducing agent (DE3917645) is known. Alternately, microfiltration followed by nanofiltration to remove the residual compounds has also been found helpful (EP657529) where substances with a high molecular weight above the size of separation are held back. However, nanofiltration membranes become clogged quickly and can be quite expensive.

Various treatment methods are disclosed in the prior art to remove color precursors present in the PDO, however, the methods are laborious, expensive and increase the cost of the polymer. For instance, Kelsey, U.S. Pat. No. 5,527,973, which is incorporated herein by reference, discloses a process for providing a purified 1,3-propanediol that can be used as a starting material for low color polyester. That process has several disadvantages including the use of large equipment and the need for dilution with large quantities of water, which are difficult to remove from the product. Sunkara et al., U.S. Pat. No. 6,235,948, which is incorporated herein by reference, discloses a process for the removal of color-forming impurities from 1,3-propanediol by a preheating, preferably with heterogeneous acid catalysts such as perfluorinated ion exchange polymers. The catalyst is filtered off, and the 1,3-propanediol is then isolated, preferably by vacuum distillation. Preparation of polytrimethylene ether glycol from purified diol gave APHA values of 30-40, however, the molecular weight of the polymers were not reported.

The polyalkylene ether glycols are generally prepared by the acid-catalyzed elimination of water from the corresponding alkylene glycol or the acid-catalyzed ring opening of the alkylene oxide. For example, polytrimethylene ether glycol can be prepared by dehydration of 1,3-propanediol or by ring opening polymerization of oxetane using soluble acid catalysts. Methods for making PO3G from the glycol, using sulfuric acid catalyst, are fully described in U.S. Patent Application publication Nos. 2002/0007043A1 and 2002/0010374A1, all of which are incorporated herein by reference. The polyether glycol prepared by the process is purified by the methods known in the art. The purification process for polytrimethylene ether glycol typically comprises (1) a hydrolysis step to hydrolyze the acid esters formed during the polymerization (2) water extraction steps to remove the acid catalyst, unreacted monomer, low molecular weight linear oligomers and oligomers of cyclic ethers, (3) a base treatment, typically with a slurry of calcium hydroxide, to neutralize and precipitate the residual acid present, and (4) drying and filtration of the polymer to remove the residual water and solids.

It is well known that the polytrimethylene ether glycol produced from the acid catalyzed polycondensation of 1,3-propanediol has quality problems, in particular, the color is not acceptable to the industry. The polymer quality is in general dependent on the quality of the raw material, PDO. Besides the raw material, the polymerization process conditions and stability of the polymer are also responsible for discoloration to some extent. Particularly in the case of polytrimethylene ether glycol, the polyether diols tend to have light color, a property that is undesirable in many end-uses. The polytrimethylene ether glycols are easily discolored by contact with oxygen or air, particularly at elevated temperatures, so the polymerization is effected under a nitrogen atmosphere and the polyether diols are stored in the presence of inert gas. As an additional precaution, a small concentration of a suitable antioxidant is added. Preferred is butylated hydroxytoluene (BHT, 2.6-di-t-butyl-4-methylphenol) at a concentration of about 100-500 microg/g (micrograms/gram) polyether.

Also, attempts have been made to reduce the color of polytrimethylene ether glycols by conventional means without much success. For instance, Morris et al., U.S. Pat. No. 2,520,733, which is incorporated herein by reference, notes the peculiar discoloration tendency for the polytrimethylene ether glycol from the polymerization of PDO in the presence of acid catalyst. The many methods they tried that failed to improve the color of polytrimethylene glycols included the use of activated carbons, activated aluminas, silica gels, percolation alone, and hydrogenation alone. Consequently, they developed a process for the purification of polyols prepared from 1,3-propanediol in the presence of acid catalyst (2.5 to 6% by weight) and at a temperature from about 175° C. to 200° C. This purification process involves percolation of the polymer through Fuller's earth followed by hydrogenation. This extensive purification process gave a final product that was light yellow in color, in fact, this procedure yielded polytrimethylene ether glycol (Example XI therein) for which the color was only reduced to an 8 Gardner color, a quality corresponding to an APHA value of >300 and totally inadequate for current requirements.

Mason, in U.S. Pat. No. 3,326,985, which is incorporated herein by reference, discloses a procedure for the preparation of polytrimethylene ether glycol of molecular weights in the range of 1200-1400 possessing improved color by vacuum stripping, under nitrogen, polytrimethylene ether glycol of lower molecular weight. The color levels, however, are not quantified and would not have approached the above requirement.

As a result, PO3G having low color and process for producing such a PO3G have been desired.

SUMMARY OF THE INVENTION

A process is disclosed comprising contacting 1,3-propanediol with a suitable polymerization catalyst to produce polytrimethylene ether glycol or random polytrimethylene ether ester, wherein the 1,3-propanediol, before contact, comprises about 10 microg/g (micrograms per gram) or less of peroxide compounds based on the weight of the 1,3-propanediol, and about 100 microg/g or less carbonyl compounds based on the weight of the 1,3-propanediol. Preferably the 1,3-propanediol used in the process is selected based upon it comprising about 10 microg/g or less peroxide compounds, based on the weight of 1,3-propanediol, and about 100 microg/g or less carbonyl compounds based on the weight of the 1,3-propanediol. Preferably, the 1,3-propanediol comprises about 100 microg/g or less of monofunctional alcohol compounds based on the weight of the PDO. In addition, polytrimethylene ether glycol and random polytrimethylene ether ester prepared by the process.

DETAILED DESCRIPTION OF THE INVENTION

Unless stated otherwise, all percentages, parts, ratios, etc., are by weight. Trademarks are shown in upper case.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed.

This invention is directed to the production of an excellent quality of polytrimethylene ether glycol (also referred to as "PO3G") or random polytrimethylene ether ester. While most of the disclosure is directed to preparing PO3G, the process of preparing the random polytrimethylene ether ester is also disclosed and the teachings applicable to the PO3G should readily be recognizable as also applying to the random polytrimethylene ether ester and therefore, for simplicity and ease of reading, the disclosure will not repeatedly refer to the random polytrimethylene ether ester.

This invention is directed to the production of an excellent quality of polytrimethylene ether glycol from the (acid) catalyzed polycondensation of 1,3-propanediol. The present inventors have found that to date the quality of the 1,3-propanediol manufactured from the petrochemical routes is not good enough to produce high quality PO3G polymers. This is due to the presence of impurities such as carbonyl compounds, e.g., hydroxypropionaldehyde, peroxide-forming compounds of uncertain structure, monofunctional alcohols (such as 2-hydroxyethyl-1,3-dioxane, hereinafter "HED"), and acidic compounds detectable by pH measurements. The monofunctional alcohols act as chain terminating agents during polymerization, they can be incorporated into the polymer as "dead ends" that can affect the polymer functionality. Monofunctional alcohols may or may not contribute to color formation. However, in general, the carbonyl compounds frequently are associated with color bodies, one could expect that the greater the carbonyl number, the darker will be the color. Some of the above impurities in the PDO can generate color during the acid catalyzed polymerization process.

In accordance with a first aspect, the present invention comprises contacting 1,3-propanediol with a suitable polymerization catalyst to produce polytrimethylene ether glycol, wherein the 1,3-propanediol, before contact, comprises about 10 microg/g or less peroxide compounds, based on the weight of the 1,3-propanediol. In general, alkenes, ethers, and allylic species are prone to peroxide formation and the formed peroxides can be determined by use of commercially available test strips or by iodometric titration in a manner known in the art.

In accordance with another aspect of the present invention, the 1,3-propanediol further comprises about 100 microg/g or less carbonyl compounds based on the weight of the PDO. Preferably, the PDO comprises about 75 microg/g or less, more preferably about 50 microg/g or less, most preferably about 25 microg/g or less carbonyl compounds based on the weight of the PDO. Illustrative examples of carbonyl compounds are hydroxypropionaldehyde and aldehydes present in an acetal form, such as acetals from the reaction 3-hydroxypropionaldehyde and 1,3-propandiol. The carbonyl content is determined by UV detection after conversion of the carbonyl compounds into the dinitrophenylhydrazones in a manner well known in the art.

In accordance with another aspect of the present invention, the 1,3 propanediol further comprises about 100 microg/g or less monofunctional alcohol compounds based on the weight of the PDO. Preferably, the PDO comprises about 75 microg/g or less, more preferably about 50 microg/g or less, most preferably about 25 microg/g or less monofunctional alcohol compounds based on the weight of the PDO. Illustrative examples of a monofunctional alcohol compounds are HED and 3-hydroxytetrahydropyran.

In accordance with another aspect of the present invention, the 1,3-propanediol contains at least 99.95% by weight of said diols, i.e., it is at least 99.95% pure.

The 1,3-propanediol preferably contains low amounts of acidic impurities, such as organic acids. The pH of an aqueous 1,3-propanediol solution can be used to determine the presence and levels of acid impurities. Thus, in accordance with another aspect of the present invention, a blend of the 1,3-propanediol with an equal weight of distilled water has a pH ("50/50 pH") between 6.0 and 7.5, preferably between 6.0 and 7.0.

In accordance with another aspect, the present invention provides a process comprising contacting a biochemically-derived 1,3-propanediol with a suitable polymerization catalyst to produce polytrimethylene ether glycol, wherein the 1,3-propanediol has a 50/50 pH of 6.0-7.5 and comprises about 100 microg/g or less carbonyl compounds, about 10 microg/g or less peroxide compounds and about 100 microg/g or less monofunctional alcohol compounds based on the weight of the PDO.

The present inventors have found that starting with a raw material containing low amounts of these impurities, particularly those below the limits specified herein, substantially reduces or eliminates altogether the need to post-treat the PDO and PO3G. Preferably, the PDO is biochemical PDO (is biochemically derived). Most preferably, the PDO used in processes in accordance with the present invention is derived from biological and renewable sources as described above, i.e., is prepared from a fermentation process using a renewable source feedstock such as glucose (e.g., corn feed stock) or other carbohydrates.

In accordance with another aspect of the present invention, a composition comprises: PO3G or random polytrimethylene ether ester from 1,3-propanediol, wherein the 1,3-propanediol comprises about 100 microg/g or less carbonyl compounds, about 10 microg/g or less peroxide compounds and, preferably, about 100 microg/g or less monofunctional alcohol compounds, based on the weight of 1,3-propanediol. According to yet another aspect in accordance with the present invention, polytrimethylene ether glycol is derived from the polymerization of biochemically-derived 1,3-propanediol having the aforementioned properties.

Preferably, the 1,3-propanediol used according to the present invention has a color value of less than about 10 APHA. More preferably, the 1,3-propanediol used according to the present invention has a color value of less than about 5 APHA. The APHA color measurement is described in Test Method 1, below.

A simple procedure provides a quick method to ascertain the PDO quality for PO3G production, without the time-consuming procedure to make the PO3G. The procedure depends on the finding that impurities in the PDO that would cause color formation in the PO3G reveal themselves rapidly under the mild conditions of the accelerated acid heat test (AAHT, Test Method 6). The AAHT procedure involves a short heating period with concentrated sulfuric acid (1% by weight based on the PDO). The heating period is 10 min. at 170° C. Thus, the AAHT procedure converts color precursors to color, but no significant polyether glycol formation occurs. Preferably, the PDO has a color value after AAHT of less than about 15 APHA. More preferably, the PDO has a color value after AAHT of less than about 10 APHA.

1,3-propanediol with the desired properties can be prepared directly or by post-treatment techniques. For instance, suitable 1,3-propanediol can be prepared by the method described in U.S. patent application Ser. No. 10/839,188, filed May 5, 2004 (published as U.S. 2005-0069997 A1, which is incorporated herein by reference. Suitable 1,3-propanediol can also be prepared by post-treating 1,3-propanediol prepared by biological or chemical routes as described in U.S. patent application Ser. No. 101839,655, filed May 4, 2004 (published as U.S. 2004-0260125 A1) or 10/634,666, filed Aug. 5, 2003 (published as U.S. 2004-0225161 A1), both of which are incorporated herein by reference. Preferably, for efficiency and economy, 1,3-propanediol is prepared by a biological route without use of such a post-treatment.

The PO3G made from the PDO of the present invention can be PO3G homo- or co-polymer. For example, the PDO can be polymerized with other diols (below) to make co-polymer.

The PDO copolymers useful in the present invention can contain up to 50% by weight (preferably 20% by weight or less) of comonomer diols in addition to the 1,3-propanediol and/or its oligomers. Comonomer diols that are suitable for use in the process include aliphatic diols, for example, ethylenediol, 1,6-hexanediol, 1,7-heptanediol, 1,8-octanediol, 1,9-nonanediol, 1,10-decanediol, 1,12-dodecanediol, 3,3,4,4,5,5-hexafluro-1,5-pentanediol, 2,2,3,3,4,4,5,5-octafluoro-1,6-hexanediol, 3,3,4,4,5,5,6,6,7,7,8,8,9,9,10,10-hexadecafluoro-1,12-dodecanediol, cycloaliphatic diols, for example, 1,4-cyclohexanediol, 1,4-cyclohexanedimethanol and isosorbide, polyhydroxy compounds, for example, glycerol, trimethylolpropane, and pentaerythritol. A preferred group of comonomer diol is selected from the group consisting of 2-methyl-1,3-propanediol, 2,2-dimethyl-1,3-propanediol, 2,2-diethyl-1,3-propanediol, 2-ethyl-2-(hydroxymethyl)-1,3-propanediol, 1,6-hexanediol, 1,8-octanediol, 1,10-decanediol, isosorbide, and mixtures thereof. $C_6$-$C_{10}$ diols are particularly useful.

One preferred copolymer is poly(trimethylene-ethylene ether) glycol and is described in U.S. patent application Ser. No. 10/621,805, filed Jul. 17, 2003 (now U.S. Pat. No. 6,905,765), 10/621,861, filed Jul. 17, 2003 (published as U.S. 2004-0127673 A1), 10/621,892, filed Jul 17, 2003 (published as U.S. 2004-0030095 A1), 10/621,896, filed Jul. 17, 2003 (published as U.S. 2004-0030089 A1), and 10/743,223, filed Dec. 22, 2003 (published as U.S. 2005-0014661 A1), all of which are incorporated herein by reference. The poly(trimethylene-ethylene ether) glycol is preferably prepared by polycondensation of 1,3-propanediol reactant and ethylene glycol reactant. Preferably, the 1,3-propanediol reactant is selected from the group consisting of 1,3-propanediol, and oligomers of 1,3-propanediol having a degree of polymerization of 2 to 3, and mixtures thereof. Preferably, the ethylene glycol reactant is selected from the group consisting of ethylene glycol, and oligomers of ethylene glycol having a degree of polymerization of 3 to 4, and mixtures thereof More preferably the poly(trimethylene-ethytefle ether) glycol is prepared by the polycondensation of 1,3-propanecliol and ethylene glycol. The poly(trimethylene-ethylefle ether) glycol is preferably prepared by acid catalyzed polycondensation of about 50 to about 99 mole % 1,3-propanediol and about 50 to about 1 more % ethylene glycol, more preferably about 60 to about 98 mole % 1,3-propanediol and about 40 to about 2 mole % ethylene glycol, and even more preferably about 70 to about 98 mole % 1,3-propanediol and about 30 to about 2 mole % ethylene glycol.

Thermal stabilizers, antioxidants and coloring materials may be added to the polymerization mixture or to the final polymer if desired or necessary.

In some instances, it may be desirable to use up to 10% or more of low molecular weight oligomers where they are available. Thus, preferably the starting material comprises 1,3-propanediol and the dimer and trimer thereof. The most preferred starting material is comprised of 90% by weight or more 1,3-propanediol, more preferably 99 weight % or more.

Processes for producing PO3G from PDO are generally known in the art. For example, U.S. Pat. No. 2,520,733, which is incorporated herein by reference, discloses polymers and copolymers of polytrimethylene ether glycol and a process for preparation of these polymers from 1,3-propanediol in the presence of a dehydration catalyst such as iodine, inorganic acids (e.g., sulfuric acid) and organic acids.

The polytrimethylene ether diol is, preferably, prepared by an acid-catalyzed polycondensation of 1,3-propanediol as described in U.S. Published Patent Application Numbers 2002/7043 A1 and 2002/10374 A1, and U.S. patent application Ser. Nos. 10/423,363, filed Apr. 25, 2003 (published as U.S. 2004-0211729 A1) and 10/871,622, filed Jun. 18, 2004 (published as U.S. 2004-0211729 A1), all of which are hereby incorporated by reference. The polytrimethylene ether glycol can also be prepared by a ring-opening polymerization of a cyclic ether, oxetane. as described in J. Polymer Sci., Polymer Chemistry Ed. 23,429-444 (1985) which is also incorporated by reference. The polycondensation of 1,3-propanediol is preferred over the use of oxetane. As desired, the polyether glycol prepared by the process of the present invention can be purified further to remove the acid present by means known in the art. It should be recognized that in certain applications the product might be used without further purification. However, the purification process improves the polymer quality and functionality significantly and it is comprised of (1) a hydrolysis step to hydrolyze the acid esters that are formed during the polymerization and (2) typically (a) water extraction steps to remove the acid, unreacted monomer, low molecular weight linear oligomers and oligomers of cyclic ethers, (b) a solid base treatment to neutralize the residual acid present and (c) drying and filtration of the polymer to remove the residual water and solids.

The random polytrimethylene ether ester can be prepared by polycondensation of 1,3-propanediol and about 10 to about 0.1 mole % of aliphatic or aromatic diacid or diester (e.g., terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof, and dimethyl terephthalate, bibenzoate, isophthlate, naphthalate and phthalate; and combinations thereof. Of these, dimethyl terephthalate and isophthalate, and mixtures thereof) such as described in U.S. Pat. No. 6,608,168, which is incorporated herein by reference. By "1,3-propanediol reactant" is meant 1,3-propanediol, and oligomers and prepolymers of 1,3-propanediol having a degree of polymerization of 2 to 20, preferably 2 to 9, and mixtures thereof. In addition, "oligomer" is used to refer to dimer and trimer of 1,3-propanediol; "prepolymer" is used to refer to 1,3-propanediol based compounds having a degree of polymerization of 4 to 20, and "polytrimethylene ether glycol" and "polytrimethylene ether ester" are used to refer to polymers having a Mn of 500 or more. The preferred starting material for this invention is 1,3-propanediol and, for simplicity, applicants will refer to 1,3-propanediol in describing the invention. Here, it should be noted that the oligomers and prepolymers are generally formed and then used as to form the random polytrimethylene ether ester, and that the process of forming a random polytrimethylene ether ester from 1,3-propanediol and diacid or diester should be understood to include any steps to form such an oligomer or prepolymer prior to reaction with the diacid or diester. The compounds are prepared by polycondensation of 1,3-propanediol and about 10 to about 0.1 mole % of aliphatic or aromatic diacid (e.g., dimethyl terephthlate). Preferably they are prepared by polycondensation of about 90 to about 99.9 mole % of 1,3-propanediol reactant, calculated based on the amount of 1,3-propanediol and 1,3-propanediol units, and about 10 to about 0.1 mole % of aliphatic or aromatic diacid or diester, most preferably dimethyl terephthalate or terephthalic acid. They are also preferably prepared by polycondensation of about 80 to about 99.1 mole % of 1,3-propanediol reactant, calculated based on the amount of 1,3-propanediol and 1,3-propanediol units, about 10 to about 0.1 mole % of aliphatic or aromatic diacid or diester, (preferably dimethyl terephthalate or terephthalic acid), and up to about 10 mole % of diol reactant other than 1,3-propanediol reactant, calculated based on the amount of diol and diol units.

The PO3G made from the PDO of the present invention, preferably, has a color value of less than about 50 APHA. More preferably, the PO3G color value is less than 30 APHA. Preferably, the PO3G products made using the PDO monomer/oligomers of the present invention have a molecular weight of about 250 to about 5000, preferably about 500 to about 4000, and most preferably about 1000 to about 3000.

The process of the present invention will provide polytrimethylene ether glycol with improvements in functionality and polymer color.

The PO3G of this invention has many end-uses. They can be used to make polyetheresters, polyether ester amides, polyurethanes and polyurethane-ureas as described in U.S. Pat. Nos. 6,562,457, 6,590,065, 6,608,168, and 6,599,625, U.S. 2004-0030060 A1, and U.S. patent application Ser. Nos. 10/621,805, filed Jul. 17, 2003 (now U.S. Pat. No. 6,905,765), 10/621,861, filed Jul. 17, 2003 (published as US 2004-0127673 A1), 10/621,892, filed Jul. 17, 2003 (published as US 2004-0030095 A1), 10/621,896, filed Jul. 17, 2003 published as US 2004-0030089A1 and 10/872,685, filed Jun. 21, 2004, all of which are incorporated herein by reference. The PO3G can be used in coating and lubricants, such as described in U.S. patent application Ser. Nos. 10/743,223. filed Dec. 22, 2003 (published as US 2005-0014661 A1), 10/804,259, filed Mar. 19, 2004 (published as US 2004-0258923 A1), and 10/804,260, filed Mar. 19, 2004 (published as US 2004-0249061 A1), all of which are incorporated herein by reference.

MATERIALS AND TEST METHODS

Test Method 1. Measurement of APHA Values

A Hunterlab ColorQuest Spectrocolorimeter (Reston, Va.) was used to measure the PDO and polymer color. Color numbers are measured as APHA values (Platinum-Cobalt System) according to ASTM D-1209. The polymer molecular weights are calculated from their hydroxyl numbers obtained from titration method.

Test Method 2. Measurement of PDO Content & HED (by Gas Chromatography).

Undiluted PDO samples are injected into a gas chromatograph equipped with a Wax (e.g., Phenomenex Zorbax Wax, DB-Wax, HP Innowax, or equivalent) capillary column and flame ionization detector (FID). The FID produces a signal proportional to the concentration of the analyte as a function of time, and the signal is acquired on an integrator or stored as x,y data in a computer. Each component separated and detected is seen as a "peak" when the signal is plotted vs. time. All impurities are assumed to have the same wt-% response factor on the FID as PDO. The % purity is calculated as area %. Lower detection limit: 5 microg/g.

Test Method 3. Measurement of Carbonyl Content (by Spectophotometric Analysis).

Carbonyl compounds are converted to the dinitrophenylhydrazone derivatives prior to spectrophotometric quantification. Lower detection limit: 2 microg/g.

Test Method 4. Measurement of Peroxide Content

The peroxides in PDO were determined using either commercially available Peroxide Test Strips, 0.5-25 microg/g EM Quant® or iodometric titration method. The titration method involves by adding a 5 g of sample to 50 ml of 2-propanol/acetic acid solution and then by titrating the solution with 0.01 N sodium thiosulfate solution. The lower detection limit is 0.5 microg/g. When using test strips, concentrations greater than 25 microg/g can be quantified by dilution of samples to the 5-25 microg/g range or the use of test strips designed for higher concentrations.

Test Method 5. Measurement of pH (pH Shows the Level of Acidic Impurities on a Logarithmic Scale) ("50/50 pH").

A 50:50 blend of PDO and distilled water was used to measure the pH of the solution using a pH meter.

Test Method 6. AAHT Procedure.

PDO (150 g) and 1.5 g of concentrated sulfuric acid were charged to a 250-mL three-neck flask. The solution was stirred mechanically and then heated to 170° C. for 10 min. under nitrogen atmosphere. After 10 min., the solution was cooled to room temperature and the color was measured according to Test Method 1.

EXAMPLES

Examples 1-3

1,3-propanediol (PDO) can be prepared by petrochemical routes starting from acrolein or ethylene oxide sources. DuPont is also making 1,3-propanediol using glucose derived from corn as a renewable source. Samples of PDOs from each synthesis route were analyzed for PDO content, 2-hydroxyethyl-1,3-dioxane (HED) content, carbonyl content, peroxide content and acidity value as described in Methods above. The results are shown in Table 1. APHA values were determined on the PDO before and after the AAHT procedure and the results are shown in Table 2. The PDO of Example 1 was prepared by the method described in U.S. patent application Ser. No. 10/839,188, filed May 5, 2004 (published as US 2005-0069997 A1), which is incorporated herein by reference.

TABLE 1

Chemical Analysis on 1,3-propanediol

| Example | Feed Source for PDO | PDO Purity % | HED microg/g | Carbonyls microg/g | Peroxides microg/g | pH 50/50 |
|---|---|---|---|---|---|---|
| 1 | Corn | 99.997 | ND* | ND* | ND* | 6.82 |
| 2 | Acrolein | 99.968 | 80 | 93 | 56 | 4.87 |
| 3 | Ethylene oxide | 99.917 | 310 | 198 | ND* | 5.88 |

*ND not detectable (see Test Methods for limits)

The results in Table 1 indicate the PDO originating from the biochemical route used had the highest purity and contained the least impurities versus PDO derived from petrochemical sources.

TABLE 2

Discoloration of 1,3-propanediol with acid treatment at 170° C. for 10 min.

| Example | Feed source for PDO | PDO color (APHA) before AAHT | PDO color (APHA) after AAHT |
|---|---|---|---|
| 1 | Corn | 3 | 8 |
| 2 | Acrolein | 3 | 50 |
| 3 | Ethylene oxide | 4 | 14 |

Table 2 shows that the PDO of Example 1 discolored the least after the AAHT test suggesting that there are no color precursor impurities. The purity of the acrolein-based 1,3-propanediol was higher and it contained less carbonyl compounds than ethylene oxide-based diol (as shown in Table 1). However, the acrolein based-diol discolored more strongly in the AAHT process indicating the presence of relatively high concentration of color precursor impurities. Also, this PDO contained peroxide-forming compounds as evident from the presence of peroxides.

Example 4

Preparation of PO3G from Biochemical-PDO

The 1,3-propanediol obtained from the biochemical route in Example 1 was used to make polymer as described below:

A 22-L, 4-necked, round-bottomed flask, equipped with a nitrogen inlet, and a distillation head was charged with 8392 g of 1,3-propanediol. The liquid was sparged with nitrogen at a rate of 10 L/min. and mechanical stirring (using a stirring magnet driven by a magnetic stirrer below the flask) was done for about 15 min. After 15 min., 76.35 grams of sulfuric acid was slowly added drop-wise from a separatory funnel through one of the ports over a period of at least 5 minutes. When this was finished, 15 g of PDO was added to the separatory funnel and swirled to remove any residual sulfuric acid. This was added to the flask. The mixture was stirred and sparged as above and heated to 160° C. The water of reaction was removed by distillation and was collected continuously during the polymerization reaction. The reaction was continued for 38.5 hours, after which it was allowed to cool (while stirring and sparging were maintained) to 45° C. The crude polymer obtained has a number average molecular weight of 2130 as determined by NMR and an APHA color of 59.

The crude material was hydrolyzed as follows. The crude polymer was added to a 22-L, 5-necked, round-bottom flask, (equipped with a condenser and a mechanical mixer) along with an equal volume of distilled water. This mixture was stirred mechanically, sparged with nitrogen at a rate of about 150 mL/min. and heated to 100° C. It was allowed to reflux for 4 hours after which the heat was turned off and the mixture allowed to cool to 45° C. The stirring was discontinued and the sparging reduced to a minimum. Phase separation occurred during cooling. The aqueous phase water was removed and discarded. A volume of distilled water equal to the initial amount was added to the wet polymer remaining in the flask. Mixing, sparging and heating to 100° C. was done again for 1 hour after which the heat was turned off and the material allowed to cool as before. The aqueous phase was removed and discarded.

The residual sulphuric acid was determined by titration and neutralized with an excess of calcium hydroxide. The polymer was dried under reduced pressure at 90° C. for 3 hours and then filtered through a Whatman filter paper precoated with a CELPURE C-65 filter aid. The purified polymer obtained has a number average molecular weight of 2229 as determined by NMR and an APHA color of 32.

Example 5

Preparation of PO3G from 1,3-propanediol

The polymer was prepared as described in Example 4, except the 1,3-propanediol used was derived from an acrolein route.

Example 6

Preparation of PO3G from 1,3-propanediol

The polymer was prepared as described in Example 4, except the 1,3-propanediol used was derived from an ethylene oxide route.

TABLE 3

| | Feed Source for | PO3G polymer color | | | |
|---|---|---|---|---|---|
| | | Crude Polymer | | Purified Polymer | |
| Example | PDO | Mn | Color (APHA) | Mn | Color (APHA) |
| 4 | Corn | 2130 | 59 | 2229 | 32 |
| 5 | Acrolein | 2256 | 185 | 2341 | 157 |
| 6 | Ethylene oxide | 2157 | 102 | 2170 | 109 |

Table 3 shows that the purified PO3G derived from the PDO of Example 1 had a lower color than the polymers derived from other PDOs.

Examples 7-10

Samples of PDOs prepared by biological routes from glucose derived from corn were analyzed for PDO content, 2-hydroxethyl-1,3-dioxane (HED) content, carbonyl content, peroxide content and acidity value as described above. The results are shown in Table 4. APHA values were determined on the PDO before and after the AAHT procedure and the results are shown in Table 5. These PDOs were not prepared by the method described in U.S. patent application Ser. No. 101839,188 (published as US 2005-0069997 A1) and were not post-treated by the process described in U.S. patent application Ser. No. 10/839,655 (published as US 2004-0260125 A1).

TABLE 4

Chemical Analysis on 1,3-propanediol

| Example | PDO Purity % | HED microg/g | Carbonyls microg/g | Peroxides microg/g | pH 50/50 |
|---|---|---|---|---|---|
| 7 | 99.97 | 90 | 146 | 65 | 6.71 |
| 8 | 99.96 | 110 | 449 | 228 | 4.96 |
| 9 | 99.87 | 560 | 156 | ND* | 6.20 |
| 10 | 99.96 | 80 | 190 | 214 | 6.80 |

*ND not detectable (see Test Methods for limits)

TABLE 5

Discoloration of 1,3-propanediol with acid treatment at 170° C. for 10 min.

| Example | PDO color (APHA) before AAHT | PDO color (APHA) after AAHT |
|---|---|---|
| 7 | 3 | 48 |
| 8 | 3 | 137 |
| 9 | 2 | 8 |
| 10 | 13 | 68 |

The above data shows that not all PDO prepared by biological routes from glucose derived from corn are suitable for use in the claimed invention. In addition, the PDO of Example 9 was not suitable for making good quality PO3G since the high levels of alcohols and carbonyls would lead to chain terminations (i.e., non-reactive end groups).

What we claim is:

1. A process comprising contacting 1,3-propanediol with a suitable polymerization catalyst to produce polytrimethylene ether glycol, wherein the 1,3-propanediol, before contact, comprises about 10 microg/g or less peroxide compounds, based on the weight of 1,3-propanediol, and about 100 microg/g or less carbonyl compounds based on the weight of the 1,3-propanediol.

2. The process of claim 1, wherein the 1,3-propanediol further comprises about 100 microg/g or less monofunctional alcohol compounds based on the weight of the 1,3-propanediol.

3. The process of claim 1, wherein the 1,3-propanediol further comprises about 75 microg/g or less carbony compounds based on the weight of the 1,3-propanediol.

4. The process of claim 1, wherein the 1,3-propanediol further comprises about 75 microg/g or less monofunctional alcohol compounds based on the weight of the 1,3-propanediol.

5. The process of claim 3, wherein the 1,3 propanediol further comprises about 75 microg/g or less mono-functional alcohol compounds based on the weight of the 1,3-propanediol.

6. The process of claim 1, wherein the 1,3-propanediol further comprises about 50 microg/g or less carbonyl compounds based on the weight of the 1,3-propanediol.

7. The process of claim 1, wherein the 1,3-propartediol further comprises about 50 microg/g or less monofunctional alcohol compounds based on the weight of the 1,3-propanediol.

8. The process of claim 6, wherein the 1,3-propanediol further comprises about 50 microg/g or less mono-functional alcohol compounds based on the weight of the 1,3-propanediol.

9. The process of claim 1, wherein the 1,3-propanediol further comprises about 25 microg/g or less carbonyl compounds based on the weight of the 1,3-propanediol.

10. The process of claim 1, wherein the 1,3-propanediol further comprises about 25 microg/g or less monofunctional alcohol compounds based on the weight of the 1,3-propanediol.

11. The process of claim 9, wherein the 1,3 propanediol further comprises about 25 microg/g or less monofunctional alcohol compounds based on the weight of the 1,3-propanediol.

12. The process of claim 1, wherein the 1,3-propanediol is at least 99.95% pure.

13. The process of claim 1, wherein the 1,3-propanediol comprises biochemically-derived 1,3-propanediol.

14. The process of claim 13, wherein the 1,3-propanediol is derived from a fermentation process.

15. The process of claim 14, wherein the 1,3-propanediol is derived from a fermentation process using a renewable biological source.

16. The process of claim 15, wherein the 1,3-propanediol is produced from a carbohydrate.

17. The process of claim 15, wherein the 1,3-propanediol is produced from glucose from corn.

18. The process of claim 1, wherein the 1,3-propanediol has a color value of less than about 10 APHA.

19. The process of claim 1, wherein the 1,3-propanediol has a color value of less than about 5 APHA.

20. The process of claim 1, wherein the 1,3-propanediol has a color value less than about 15 APHA when treated with 1 wt. % sulfuric acid at 170° C. for 10 minutes.

21. The process of claim 1, wherein the polytrimethylene ether glycol has a color of less than about 50 APHA.

22. The process of claim 20, wherein the polytrimethylene ether glycol has a color of less than 30 APHA.

23. The process of claim 1, wherein the polytrimethylene ether glycol has a molecular weight of from about 250 to about 5000.

24. The process of claim 10, wherein the poly-trimethylene ether glycol has a molecular weight of from about 250 to about 5000 and has a color of less than 30 APHA.

25. The process of claim 1, wherein the polytrimethylene ether glycol comprises a homopolymer.

26. The process of claim 1, wherein the polytrimethylene ether glycol comprises a copolymer.

27. The process of claim 1, wherein the polytrimethylene ether glycol comprises a copolymer of 1,3-propanediol, with at least one other C2 or C6 to C12 diol.

28. The process of claim 1, wherein the 1,3-propanediol has a 50/50 pH of about 6.0-7.5.

29. The process of claim 1, wherein the 1,3-propanediol has a 50/50 pH of about 6.0-7.0.

30. A process comprising contacting a bio-chemically-derived 1,3-propanediol with a suitable polymerization catalyst to produce polytrimethylene ether glycol, wherein the 1,3-propanediol has a 50/50 pH of about 6.0-7.5 and comprises about 100 microg/g or less carbonyl compounds, about 10 microg/g or less peroxide compounds and about 100 microg/g or less monofunctional alcohol compounds.

31. The process of claim 30, wherein the 1,3-propanediol has a color of less than about 10 APHA.

32. The process of claim 31, wherein the polytrimethylene ether glycol has a molecular weight of from about 250 to about 5000.

33. A polytrimethylene ether glycol prepared by providing 1,3-propanediol and polymerization catalyst and polymerizing 1,3-propanediol with the polymerization catalyst to form the polytrimethylene ether glycol, wherein the 1,3-propanediol contains about 100 microg/g or less carbonyl compounds, about 10 microg/g or less peroxide compounds and about 100 microg/g or less monofunctional alcohol compounds, based on the weight of 1,3 propanediol.

34. A polytriznethylene ether glycol composition as claimed in claim 33.

35. The polytrimethylene ether glycol composition of claim 34 wherein the 1,3-propanediol is bio-chemically-derived 1,3-propanediol made from a carbohydrate from a renewable source.

36. The polytrimethylene ether glycol composition of claim 35, wherein the polytrimethylene ether glycol has a molecular weight of from about 250 to about 5000 and has a color of less than 30 APHA.

37. The process of claim 1 wherein the 1,3-propanediol used in the process is selected based upon it comprising about 10 microg/g or less peroxide compounds, based on the weight of 1,3-propanediol, and about 100 microg/g or less carbonyl compounds based on the weight of the 1,3-propanediol.

* * * * *